United States Patent

[11] 3,572,765

[72] Inventor James B. Tieben
 106 Cottonwood, Dodge City, Kans. 67801
[21] Appl. No. 857,397
[22] Filed Sept. 12, 1969
[45] Patented Mar. 30, 1971

[54] COLLAPSIBLE TOW HITCH
 6 Claims, 8 Drawing Figs.
[52] U.S. Cl. .................................................. 280/491
[51] Int. Cl. .................................................. B60d 1/00
[50] Field of Search .................................................. 280/491
 (R), 491 (.5), 478 (.2), 491 (.2)

[56] References Cited
 UNITED STATES PATENTS
 3,147,027 9/1964 Bronleewe .................. 280/491(.5)
 3,281,162 10/1966 Carson ........................ 280/478(.2)
 3,281,163 10/1966 Wiebe ......................... 280/491(.5)

FOREIGN PATENTS
 257,663 4/1964 Netherlands .................. 280/491.2

Primary Examiner—Leo Friaglia
Attorney—Hume, Clement, Hume & Lee

ABSTRACT: A collapsible tow hitch is provided for use in towing a vehicle, such as a truck, behind a second vehicle, such as a tractor. The tow hitch is provided with a pair of swingable branch arms pivotally connected at their forward ends to a tow bar and individually pivotally connected at their rear ends to a pair of swingable support arms which are pivotally connected to the opposite ends of a horizontal elongated frame member. When the tow hitch is not in use it is easily collapsed into a readily accessible position in which the tow bar, branch arms and support arms are horizontally stacked alongside a mounting frame attached to the vehicle to be towed.

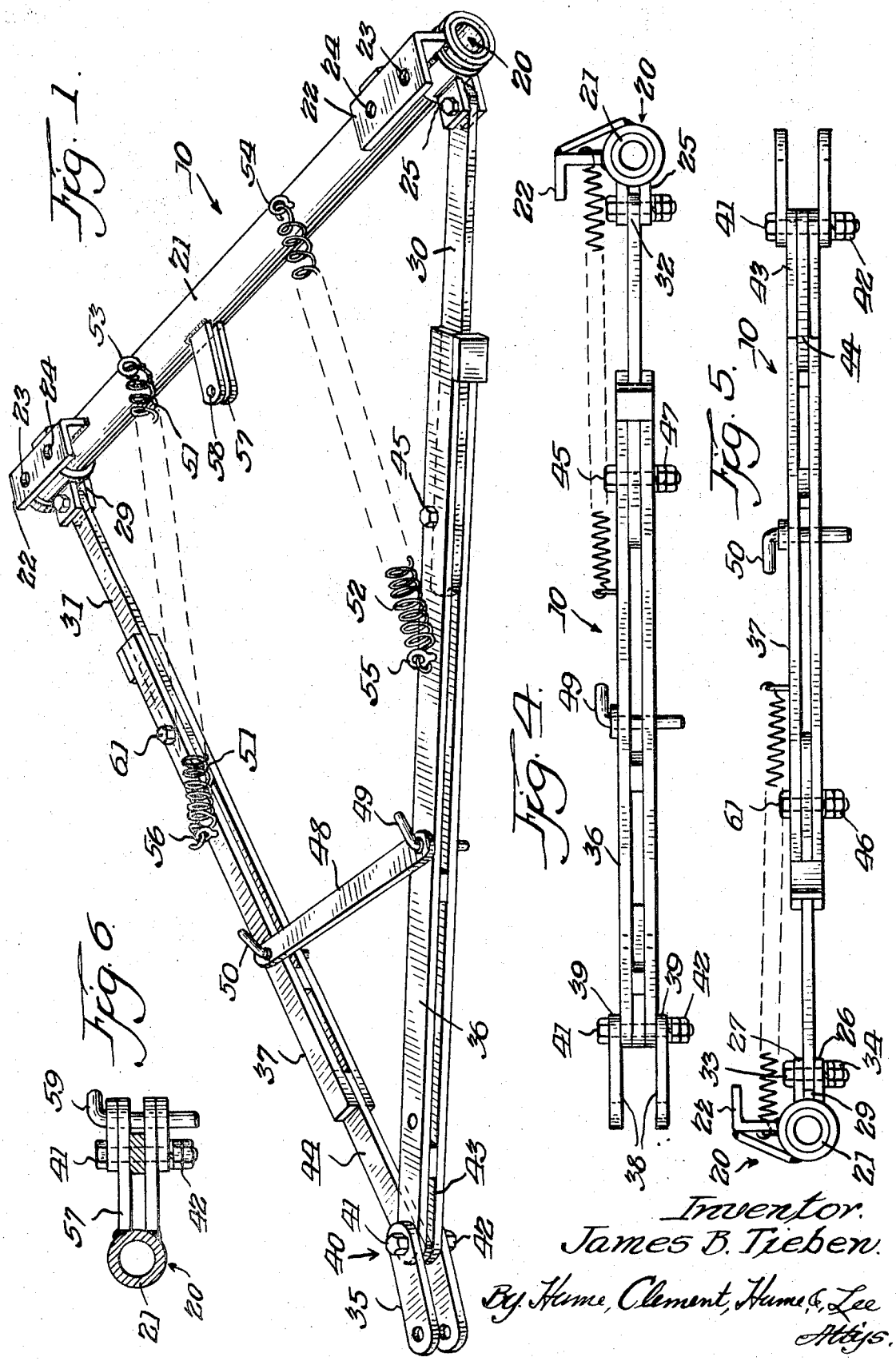

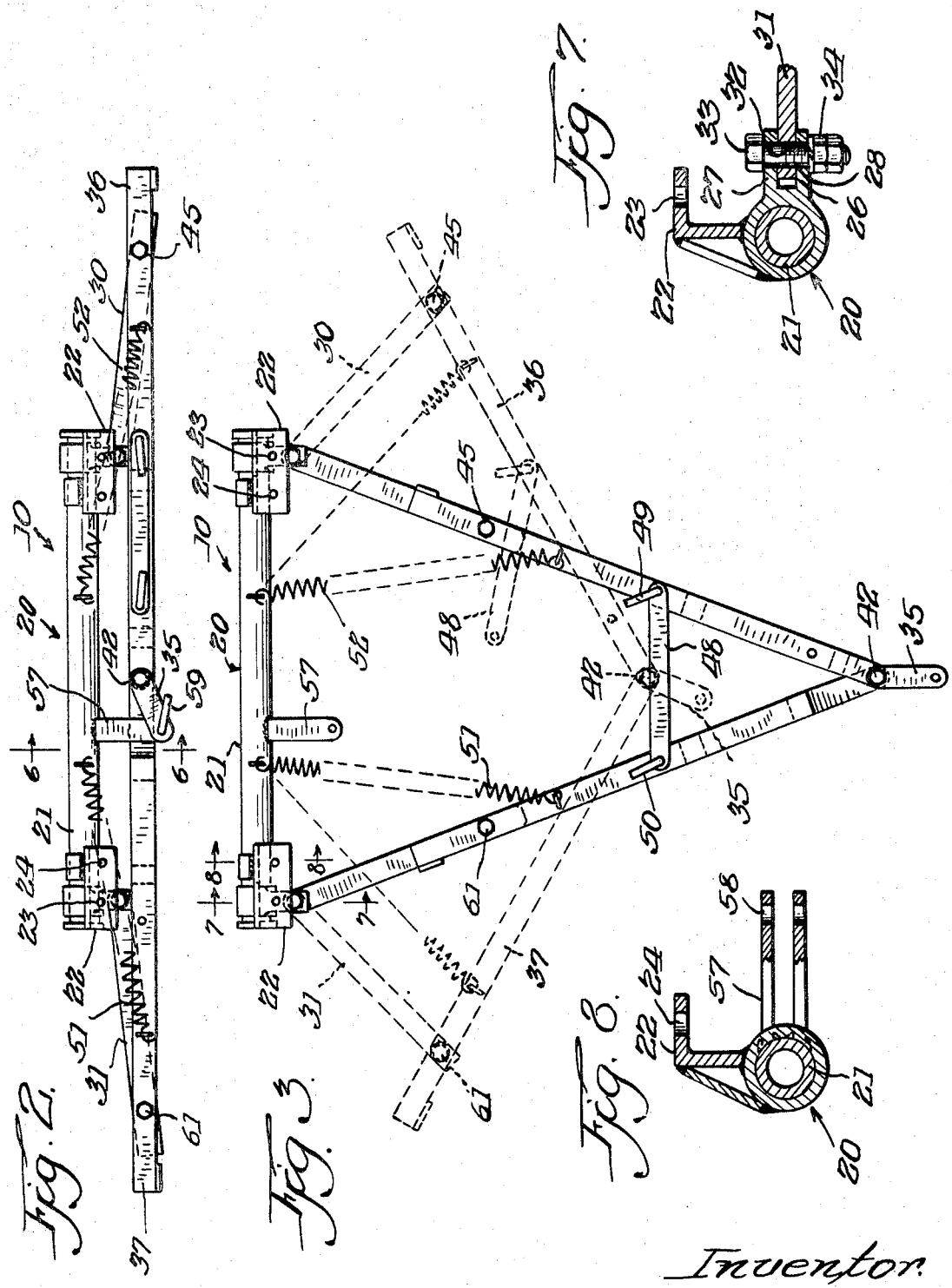

COLLAPSIBLE TOW HITCH

BACKGROUND OF THE INVENTION

This invention relates to a towing apparatus adapted to be placed in an interconnecting relationship to a towing medium and a unit to be towed for the purpose of moving the unit to be towed from place to place. More particularly, this invention relates to a collapsible tow hitch adapted for mounting on a suitable vehicle and capable of being readily collapsed into a position which neither interferes with the general usage of the vehicle nor detracts from the vehicle appearance.

In the past farmers have found it advantageous to tow a pickup truck or similar vehicle behind a tractor when the tractor is to be used in a distant location, such as a field. In this way the truck provides an available means of transportation and avoids the necessity of using the tractor on long trips. In addition, it has been recognized that a considerable saving of time can be accomplished when a truck is available for immediate use in the field.

Accordingly, a strong, lightweight, and relatively inexpensive tow hitch which can be easily mounted on a truck and yet collapsed into a readily accessible position without interfering with the operation or appearance of the truck has been desired for some time.

SUMMARY OF THE INVENTION

According to this invention there is provided a collapsible tow hitch which is made up of at least the following components:
1. a mounting frame which is adapted for connection with a unit to be towed and which has as a subcomponent an elongated horizontal frame member extending transversely to the path of travel of the unit to be towed;
2. a pair of swingable extension support arms pivotally connected to the opposite ends of the elongated frame member;
3. a pivotable tow bar which is adapted at one end for attachment to a towing medium and is pivotally connected at its opposite end to a pair of branch arms;
4. a pair of swingable branch arms which are pivotally connected at their forward ends to the tow bar and which are individually connected at their rear ends to the support arms; and
5. a pair of spring means which are individually secured to the elongated frame and to each of the branch arms so that the branch and support arms can be held in a Y-arrangement with the tow bar during towing.

When the tow hitch is being used for towing, the branch and support arms diverge rearwardly to define a Y-arrangement with the tow bar. On the other hand, the branch and support arms are adapted to move horizontally with a jackknife-type motion when the tow hitch is being collapsed. After the tow hitch is in a completely collapsed or retracted position, the tow bar, branch arms and support arms are stacked in a horizontal position alongside the mounting frame; and a locking device secured to the frame can be used to hold the tow bar and related apparatus in a collapsed position.

Among the numerous advantages of this invention are the simple construction, low-cost, high-strength and lightweight features of the tow hitch. In addition, the arrangement of parts of the tow hitch permit its collapsing into a condensed package when not in use. However, the tow hitch can be quickly extended into a towing position when desired. Moreover, the unique design of the tow hitch of this invention eliminates the need for continuous mounting and demounting of the towing structure between towing operations, and tow hitch itself presents no interference with the normal operation of the towed vehicle after mounting. Finally, the collapsible tow hitch is designed to be quickly and easily mounted on the bedrail extensions of many standard vehicles.

BRIEF DESCRIPTION OF THE DRAWING

The invention will be better understood by reference to the drawings.

FIG. 1 is a perspective view of one form of the collapsible tow hitch suitable for practicing this invention;

FIG. 2 is a plan view of the tow hitch with all of the parts in a collapsed, stored position;

FIG. 3 is a plan view of the tow hitch in a towing position and showing also in dashed lines one position of certain parts of the tow hitch unaligned prior to commencement of the towing operation;

FIG. 4 is a side elevational view of the tow hitch showing one side of the extension support and branch arms;

FIG. 5 is a side elevational view showing the opposite side of the extension support and branch arms;

FIG. 6 is an enlarged sectional view taken along line 6—6 in FIG. 2 and showing the horizontal tongue for locking the tow-hitch assembly in a collapsed position;

FIG. 7 is an enlarged sectional view taken along line 7—7 in FIG. 3; and

FIG. 8 is an enlarged sectional view taken along lines 8—8 in FIG. 3.

DESCRIPTION OF THE PREFERRED EMBODIMENT

Referring now more specifically to the drawings, the towing hitch illustrated by the drawing and broadly designated by the numeral 10 is adapted to interconnect a towing medium and a unit to be towed. Since it is contemplated that the entire tow hitch assembly be carried by the unit to be towed, there is provided a suitable mounting frame 20 that includes an elongated frame member 21 disposed horizontally in front of the unit to be towed and transversely to its normal path of travel. The mounting frame 20 can be attached to the unit to be towed through the use of the angle iron brackets 22 welded at each end of the elongated frame member 21. Each angle iron bracket is in turn provided with a set of two holes 23 and 23 and 24 which can receive a nut and bolt means and which, for example, can be used to secure the towing hitch 10 to the bedrail extension of many trucks. Other methods for securing the tow hitch to the chassis or some other suitable point on the vehicle to be towed such as the welding of the angle iron brackets to the bedrail extension are suitable for use in this invention.

A pair of clevis members 29 and 25 having upper and lower ears 26 and 27 apertured at 28 are welded to each end of the elongated frame member 21. A pair of extension support arms 30 and 31 have tongue shaped rear ends apertured at 32 so that the tongue shaped end of each support arm can be inserted between the upper and lower ears 26 and 27 and held to the clevis members 25 and 29 with a bolt 33 and lock nut 34. In this way a desired pivotal connection is made between the clevis members and the rear end of each support arm. At the same time the support arms 30 and 31 are horizontally swingable.

A tow bar 35 is connected to the forward ends of a pair of diverging branch arms 36 and 37 which in turn interconnect the tow bar and support arms 30 and 31. In this way the tow hitch 10 takes the form of a triangular frame when in towing position.

One end of the tow bar 35 is provided with a clevis 38 which can receive attaching means for connection to the towing medium. The opposite end of the tow bar is likewise provided with a clevis 39 which receives pivotal connecting means 40 in the nature of a bolt 41 and lock nut 42 and provides horizontal swinging movement of the tow bar and serves to pivotally connect the tow bar with the forward ends of diverging branch arms 36 and 37. The forward end of branch arm 36 is provided with a clevis 43 while the forward end of branch arm 37 has a tongue 44 which is received by clevis 43 so that tow bar 35, branch arm 36 and branch arm 37 are pivotally connected by bolt 41 and lock nut 42.

When the tow hitch is in a nontowing position, both branch arms 36 and 37 are horizontally swingable. This is accomplished by pivotal joining means such as bolts 61 and 45 and corresponding nuts 46 and 47 which pivotally connect the rearward end of branch arms 36 and 37 with the forward ends of support arms 30 and 31. Thus, support arm 30 and branch arm 36 form one leg of a jackknife-type link while support arm 31 and branch arm 37 form the other.

When the tow hitch is in a towing position, a horizontally swingable stabilizer brace 48, pivotally connected to branch arm 36 by pivot pin 49, is swung into a position across branch arms 36 and 37 and connected to branch arm 37 by pin 50. Stabilizer brace 48 prevents horizontal movement of the branch arms and support arms during towing. In addition, springs 51 and 52, individually attached at hooks 53 and 54 on frame member 21 and at hooks 55 and 56 on branch arms 36 and 37, are provided to further prevent horizontal movement of the branch and support arms when towing is commenced. When stabilizer brace 48 is swung into position the support and branch arms which diverge rearwardly define an A-frame arrangement with tow bar 35. However, when stabilizer brace 48 is not employed, the diverging support and branch arms form a Y-arrangement with tow bar 35.

Collapsing of tow hitch 10 can be readily accomplished by first removing pin 50 from stabilizer brace 48 and horizontally swinging the stabilizer brace away from branch arm 37. Next, a horizontal force is applied to either branch arm 36 or 37 to begin the jackknife horizontal movement of branch arms 36 and 37 and support arms 30 and 31. When the tow hitch is in a fully collapsed position tow bar 35, branch arms 36 and 37 and support arms 30 and 31 are in a horizontally stacked position alongside elongated frame member 21. A locking means, such as a horizontal clevis 57, having an opening 58, is welded to elongated frame member 21 and positioned so as to receive tow bar 35. Pin means 59 is inserted through the openings in clevis 38 of tow bar 35 and through opening 58 of horizontal clevis 57 to hold the tow bar, support arms and branch arms against movement when the tow hitch is in a collapsed position. The tow hitch is now neatly positioned under the vehicle to be towed in a manner which neither interferes with the general usage of the vehicle nor detracts from the vehicle's appearance.

When it is desired to tow a vehicle by a tractor or the like, it is only necessary to remove pin 59, followed by swinging of the support arms 30 and 31 and branch arms 36 and 37 outwardly into a towing position. Stabilizer brace 48 is then swung into position across branch arms 36 and 37 and connected to branch arm 37 with pin 50.

Having thus described one embodiment of this invention it is understood that the invention is not limited to the exact construction and operation described in this embodiment.

I claim:

1. A collapsible tow hitch comprising:
   a mounting frame adapted for connection with a unit to be towed and having an elongated frame member disposed horizontally and extending transversely to the path of travel of said unit;
   a pair of swingable extension support arms pivotally connected to the opposite ends of said elongated frame member;
   a pivotable tow bar having means at one end thereof for attaching a towing medium;
   a pair of swingable branch arms pivotally connected at their forward ends to said tow bar and individually pivotally connected at their rear ends to said support arms so as to form an end-to-end relation with said support arms, said branch and support arms diverging rearwardly so as to define a Y-formation with said tow bar when the tow hitch is in a towing position and said branch and support arms being adapted to jackknife horizontally when the tow hitch is in a collapsed position; and
   a pair of spring means individually secured to said elongated frame member and to each of said branch arms to hold said support and branch arms in a Y-formation with said tow bar when the tow hitch is in a towing position.

2. The collapsible tow hitch of claim 1 wherein a swingable stabilizer cross brace is pivotally connected to one of said branch arms and releasably connected to the second of said branch arms whereby said stabilizer brace can be secured across said branch arms to prevent movement of the branch and support arms during towing.

3. The collapsible tow hitch of claim 1 wherein said tow bar, support arms and branch arms are swingable into a horizontally stacked position alongside said mounting frame, and wherein a locking means is secured to said elongated frame member and positioned so as to engage said pivotable tow bar and to hold said tow bar, support arms and branch arms against movement when the tow hitch is in a collapsed position.

4. A collapsible tow hitch as defined in claim 3 wherein said locking means is a horizontal apertured clevis and said tow bar is a U-shaped bracket adapted to receive therein said clevis and a pin connecting means for maintaining said clevis within said U-shaped bracket when the tow hitch is in a collapsed position.

5. A collapsible tow hitch as defined in claim 1 wherein said mounting frame has two apertured angle iron brackets secured to the opposite ends of the elongated frame member, said brackets adaptable to connect said tow hitch to the unit to be towed.

6. A collapsible tow hitch as defined in claim 1 wherein:
   a. a swingable stabilizer cross brace is pivotally connected to one of said branch arms and releasably connected to the second of said branch arms whereby said stabilizer brace can be secured to said second branch arm with a pin connection so as to prevent movement of the branch and support arms during towing;
   b. a horizontal apertured clevis is secured to said elongated frame member and said tow bar is a U-shaped bracket adapted to receive therein said clevis and a pin-connecting means so as to maintain said clevis within said U-shaped bracket and to hold said tow bar, support arms and branch arms against movement when the tow hitch is in a collapsed position; and
   c. said mounting frame has two apertured angle iron brackets secured to the opposite ends of the elongated frame member, said brackets adaptable to connect the tow hitch to the unit to be towed.